US012743398B2

(12) United States Patent
Antinori et al.

(10) Patent No.: US 12,743,398 B2
(45) Date of Patent: Sep. 22, 2026

(54) TECHNIQUES TO MONITOR FOR CIRCULAR LINKS IN FILE SYSTEMS

(71) Applicant: Red Hat, Inc., Raleigh, NC (US)

(72) Inventors: Paolo Antinori, Milan (IT); Tomas Meszaros, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/952,085

(22) Filed: Nov. 19, 2024

(65) Prior Publication Data

US 2026/0140921 A1 May 21, 2026

(51) Int. Cl.
*G06F 16/11* (2019.01)

(52) U.S. Cl.
CPC .................................. *G06F 16/116* (2019.01)

(58) Field of Classification Search
CPC ............................... G06F 16/116; G06F 16/10
USPC ................ 707/823, 824, 825, 826, 827, 828
See application file for complete search history.

(56) References Cited

U.S. PATENT DOCUMENTS

2007/0078800 A1* 4/2007 Love .................. G06F 16/1734
2014/0081923 A1* 3/2014 Kajmowicz ......... G06F 11/1435 707/687
2020/0073957 A1* 3/2020 Shea ....................... G06F 16/13
2020/0226124 A1* 7/2020 Chishti .............. G06F 16/9024

* cited by examiner

*Primary Examiner* — William P Bartlett
(74) *Attorney, Agent, or Firm* — Womble Bond Dickinson (US) LLP

(57) ABSTRACT

A modification to a filesystem may be identified. It may be determined that the modification to the file system corresponds to a link in the filesystem. A processing device may update a current graph representation of links in the filesystem to produce an updated graph representation of links in the filesystem including the link that corresponds to the modification to the filesystem based on determining the modification to the file system corresponds to the link in the filesystem.

20 Claims, 7 Drawing Sheets

TECHNIQUES TO MONITOR FOR CIRCULAR LINKS IN FILE SYSTEMS

TECHNICAL FIELD

Aspects of the present disclosure relate to techniques to monitor for circular links in filesystems, more particularly, to utilizing a graph representation for circular link monitoring in file systems.

BACKGROUND

A circular link may refer to a series of links where the last link references the first link, resulting in a closed loop. In computer programming, a circular link may result in a scenario in which a first piece of code requires the result of a second piece of code to proceed, while, at the same time, the second piece of code needs the result from the first piece of code to proceed. In such a scenario may result in an endless loop. An endless loop may refer to a sequence of instructions in a computer program which loops endlessly, such as due to the loop having no terminating condition, having one that can never be met, or one that causes the loop to start over. In older operating systems with cooperative multitasking, endless loops normally caused the entire system to become unresponsive. With the preemptive multitasking model, infinite loops usually cause the program to consume all available processor time, but can usually be terminated by a user. Endless loops are one possible cause for a computer hanging or freezing; others include thrashing, deadlock, and access violations.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
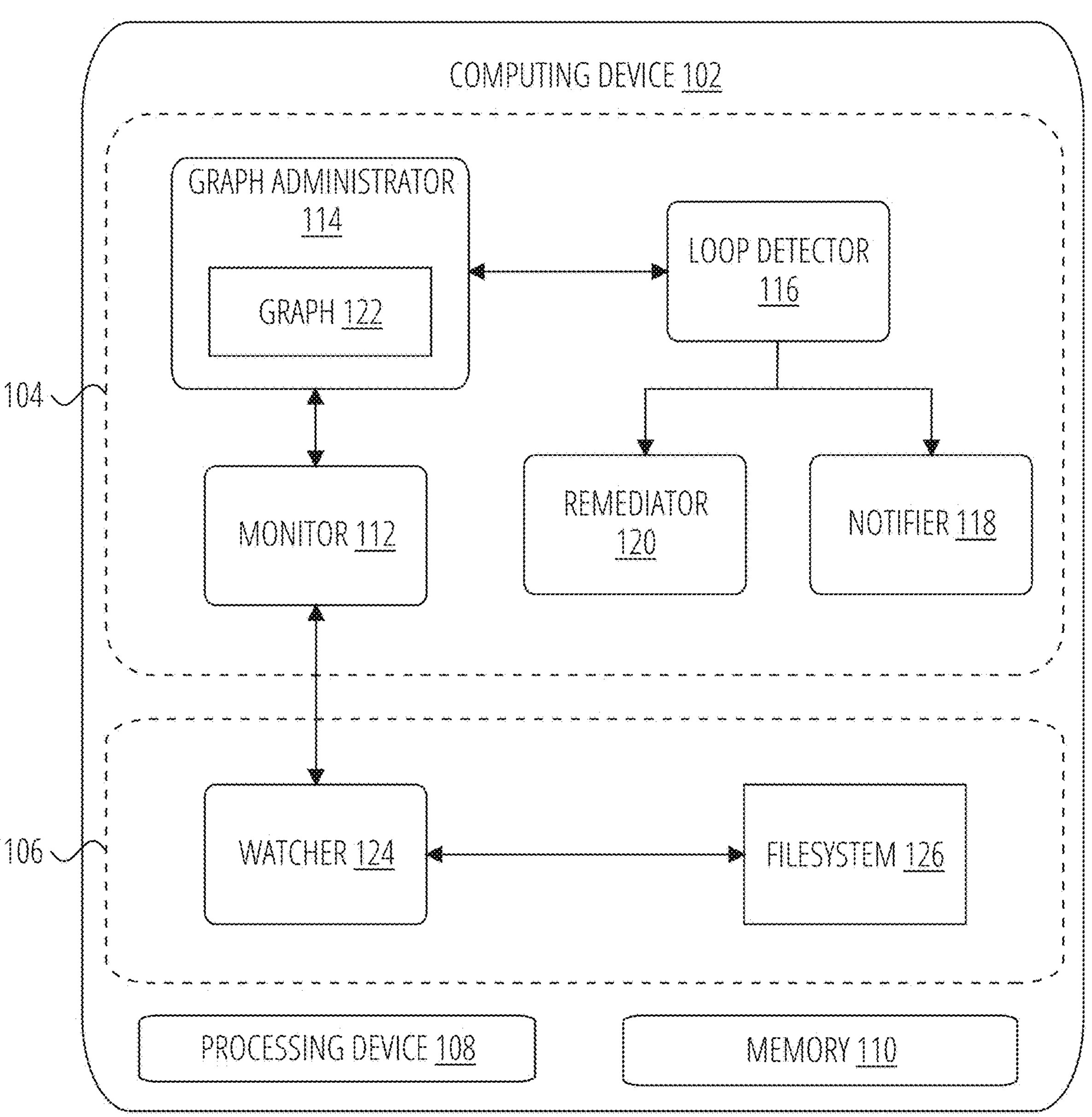
FIG. 1 illustrates an exemplary operating environment for supporting graph-based circular link monitoring according to some embodiments of the present disclosure.

The following description sets forth numerous specific details such as examples of specific systems, components, methods, and so forth, in order to provide a good understanding of various embodiments of the techniques described herein for graph-based circular link monitoring. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein.

Thus, the specific details set forth hereinafter are merely exemplary. Particular implementations may vary from these exemplary details and still be contemplated to be within the scope of the present disclosure.

Existing techniques to deal with circular links are reactive and ineffective. In many systems, circular links may only be identified in response to the effects they have on the system. For example, the existence of a circular link may result in issues with filesystem operations, tools, and processes, such as endless looping, errors during file access or operations, confusion in file management, disruptions in scripts or automated processes, etc. In existing systems, these issues may be the first sign of the presence of a circular link. However, extensive expert, manual, and time resources (e.g., developer time) are often required to investigate the issues and identify a circular link as the cause of the issues in a reactive and non-real-time manner. Additionally, or alternatively, existing tools for manual non-real-time detection of circular links need to search the entire filesystem every time they run, which is costly for large file systems and takes a considerable amount of time. Adding further complexity, oftentimes, systems may not be readily accessible for diagnosis and evaluation of issues that could be related to circular links, leading to costly hardware malfunctions and recalls. For example, edge and automotive applications may not be readily accessible by developers, requiring expensive recalls to remedy and/or resulting in dangerous hardware malfunctions. These limitations can drastically reduce the adaptability, reliability, and predictability of systems, contributing to limited applicability, undependable performance, and systems, devices, and techniques with limited capabilities.

Accordingly, many embodiments disclosed hereby provide various techniques and features for automatically and proactively identifying circular links in filesystems. For example, embodiments may utilize a filesystem monitor and a loop detector to monitor for and detect changes in a filesystem in real-time in order to detect circular links. More specifically, various embodiments utilize a graph representation for circular link monitoring and/or remediation in filesystems. For example, an internal graph representation of links (e.g., symbolic links) may be constructed and maintained continuously in real-time by leveraging filesystem events to identify filesystem changes and trigger updates to the graph representation. Further, the graph representation may be analyzed, such as with a cycle detection algorithm, to proactively identify circular links and avoid, or reduce, negative consequences of circular links. In many embodiments, continuous real-time updates to the graph representation enable circular links to be identified without having to scan the entire filesystem, improving efficiency and speed. Accordingly, embodiments can detect changes that produce an endless loop in real-time. In some embodiments, one or more of these techniques may be executed as a background daemon. Upon detection of a circular link, users may be alerted immediately and/or detection results can be piped into follow-up automation that resolves the problem, thus allowing for remediation before the circular links cause problems to the system. In several embodiments, these techniques may be implemented to monitor and detect circular symbolic links in Linux filesystems in real-time. In many embodiments, these techniques may be implemented in systems that are not readily accessible by developers (e.g., edge and/or automotive applications) to avoid costly hardware malfunctions and/or recalls.

In these and other ways, components/techniques described hereby may provide many technical advantages to monitoring for circular links in filesystems. For example, real-time identification of circular links in filesystems can be reliably and efficiently implemented. In another example, circular links can be remediated before causing operational issues. In yet another example, circular links can be identified without having to scan the entire filesystem, such as by using a graph representation of links. Therefore, the computer-based techniques of the current disclosure improve the functioning of computer systems, resulting in better performance and improved capabilities as compared to conventional approaches. Therefore, embodiments disclosed hereby can be practically utilized to improve the functioning of a computer and/or to improve a variety of technical fields including cycle detection, edge systems, filesystems, automotive applications, preventative detection, circular link monitoring, and circular link remediation.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 illustrates an operating environment 100 for supporting graph-based circular link monitoring according to some embodiments. Operating environment 100 includes a computing device 102 with a user space 104, a kernel space 106, a processing device 108, and a memory 110. The user space 104 includes a monitor 112, a graph administrator 114 with graph 122, loop detector 116, notifier 118, and remediator 120. The kernel space 106 includes a watcher 124 and a filesystem 126. In various embodiments, the components of computing device 102 may interoperate to implement graph-based circular link monitoring. For example, graph 122 may include an internal graph representation of symbolic links that enables the detection of changes to the filesystem 126 that produce an endless loop in real-time. In several embodiments, the graph administrator 114 constructs and maintains the graph 122 based on indications generated by monitor 112 in response to events generated by watcher 124 due to modifications to the filesystem 126. Further, loop detector 116 may analyze the graph 122 and cause notifier 118 and/or remediator 120 to perform various actions to generate alerts and/or perform remedial actions in response to the detection of a circular loop. One or more components of FIG. 1 may be the same or similar to one or more other components disclosed hereby. Further, aspects discussed with respect to various components in FIG. 1 may be implemented by one or more other components from one or more other embodiments without departing from the scope of this disclosure. For example, one or more components implemented in user space 104 may be implemented in kernel space 106, or vice-a-versa, without departing from the scope of this disclosure. In another example, one or more components of computing device 102 may be implemented by another computing device without departing from the scope of this disclosure. Embodiments are not limited in this context.

In the illustrated embodiment, the watcher 124 may continuously monitor the filesystem 126 for modifications (e.g., files being created, deleted, moved, etc.). For example, an application (not shown) executing on computing device 102 may create a symbolic link in filesystem 126. In another example, the modification to the filesystem 126 may be generated by a job implemented by a container orchestration system. The monitor 112 may read the output from the watcher 124. Further, when the monitor 112 detects any change to the filesystem 126 reported by watcher 124, the monitor 112 may determine whether the modified element (e.g., file) is a link, such as a symbolic link (e.g., symlink). If the modified element is a link, such as a symlink, the graph administrator 114 may be notified. The graph administrator 114 may then update the graph 122 to include the link. This technique can be utilized to ensure that there is always an up to date and accurate representation of the relationships between links in the file system.

The loop detector 116 may analyze the graph 122 to determine if any circular links are present in the filesystem 126. For example, the loop detector 116 may utilized a cycle detection algorithm to analyze the graph 122 to determine if any circular links are present in the filesystem 126. If a circular link is present, then the loop detector 116 may utilize the notifier 118 to alert a user (e.g., developer or administrator) of the circular link and/or the remediator 120 to implement remedial actions to reduce or prevent negative consequences of the circular link. For example, circular symbolic links may present problems for a wide array of programs that interact with the filesystem 126, such as tar, rsync, find, grep, various filesystem backup tools, file managers, hypertext transfer protocol (HTTP) servers, integrated developer environments, version control systems, etc. Accordingly, by utilizing the techniques disclosed hereby, the circular links can be detected in real time before the applications on the system encounter problems by hitting the circular links.

In many embodiments, the notifier 118 and/or remediator 120 may operate to react to a circular link in a manner that reduces or prevents negative impacts. The remediator 120 may be utilized to perform various remedial actions and/or damage limiting actions. In various embodiments, the remedial actions and/or damage limiting actions may be utilized to prevent system damage until a developer can resolve (or verify resolution of) the circular link. In several embodiments, the remedial actions and/or damage limiting actions may be utilized to resolve or correct the circular link automatically without user interaction. In some embodiments, the remediator 120 may place the computing device 102 into a safe or limited mode. For example, the operating system of computing device 102 may be placed into a safe mode until a developer can ensure the circular link has been resolved. In many embodiments, the remediator 120 may block access to one or more portions of the filesystem 126. For example, the remediator 120 may block access to at least one of the links comprising the circular link. In various embodiments, the remediator 120 may delete one or more portions of the circular link. For example, the remediator 120 may cause the last link added to the graph 122 to be deleted from the filesystem 126. In some embodiments, one or more remedial actions and notifications may be performed as part of a workflow implemented in response to detection of a circular link in the filesystem 126.

Many of the operations described with respect to remediator 120 may be performed in conjunction with one or more notifications and alerts generated by notifier 118. However, in some embodiments, the remediator 120 may not be included without departing from the scope of this disclosure. For example, in some embodiments, the loop detector 116 may provide indications of a circular link to one or more consumers (e.g., users, developers, administrators, other system components), but the consumers may be responsible for resolving the circular link.

In various embodiments, the loop detector 116 may analyze the graph 122 independent of updates to the graph 122. For example, the loop detector 116 may analyze the graph 122 periodically and/or in response to expiration of a predefined period of time. In other embodiments, the loop detector 116 may analyze the graph 122 dependent on updates to the graph 122. For example, the loop detector 116 may analyze the graph 122 in response to graph administrator 114 updating the graph 122. Continuing with the previous example, the graph administrator 114 may provide an indication to the loop detector 116 when updates are made to the graph 122 to trigger the loop detector 116 to analyze the graph 122 for circular links. In many embodiments, the graph-based loop detection system may be ran continuously while computing device 102 operates. In various embodiments, operation of the graph-based loop detection system may be initiated as part of a startup procedure for computing device 102. In various such embodiments, this may occur as a background operation.

The user space 104 and kernel space 106 may be utilized to provide separate address spaces or separate regions of a single address space (e.g., in virtual memory). In various embodiments, the filesystem 126 may comprise a virtual filesystem. This separation can provide memory protection and hardware protection from malicious or errant software behavior. In various embodiments, kernel space 106 is reserved for running a privileged operating system kernel, kernel extensions, and device drivers. User space 104, on the other hand, is where application software and some device drivers execute. More generally, user space 104 may refer to code that runs outside of the operating system's kernel. In various embodiments described hereby, the graph-based loop detection system can utilize components in both the user space 104 and the kernel space 106. For example, the watcher 124 may comprise an inotifywatch utility (e.g., leveraging inotify in Linux kernel subsystem) to watch for modifications to filesystem 126. In some embodiments, one or more components of user space 104 and/or kernel space 106 may be implemented as a background daemon, such as loop detector 116.

It should be noted that although a single processing device 108 and a single memory 110 are depicted in the computing device 102 of FIG. 1 for simplicity, other embodiments may include multiple processing devices, storage devices, or devices. Processing device 108 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 108 may also include one or more special-purpose processing devices such as an application specific integrated circuit (ASIC), a field programmable gate array (FPGA), a digital signal processor (DSP), network processor, or the like.

Figure 2:
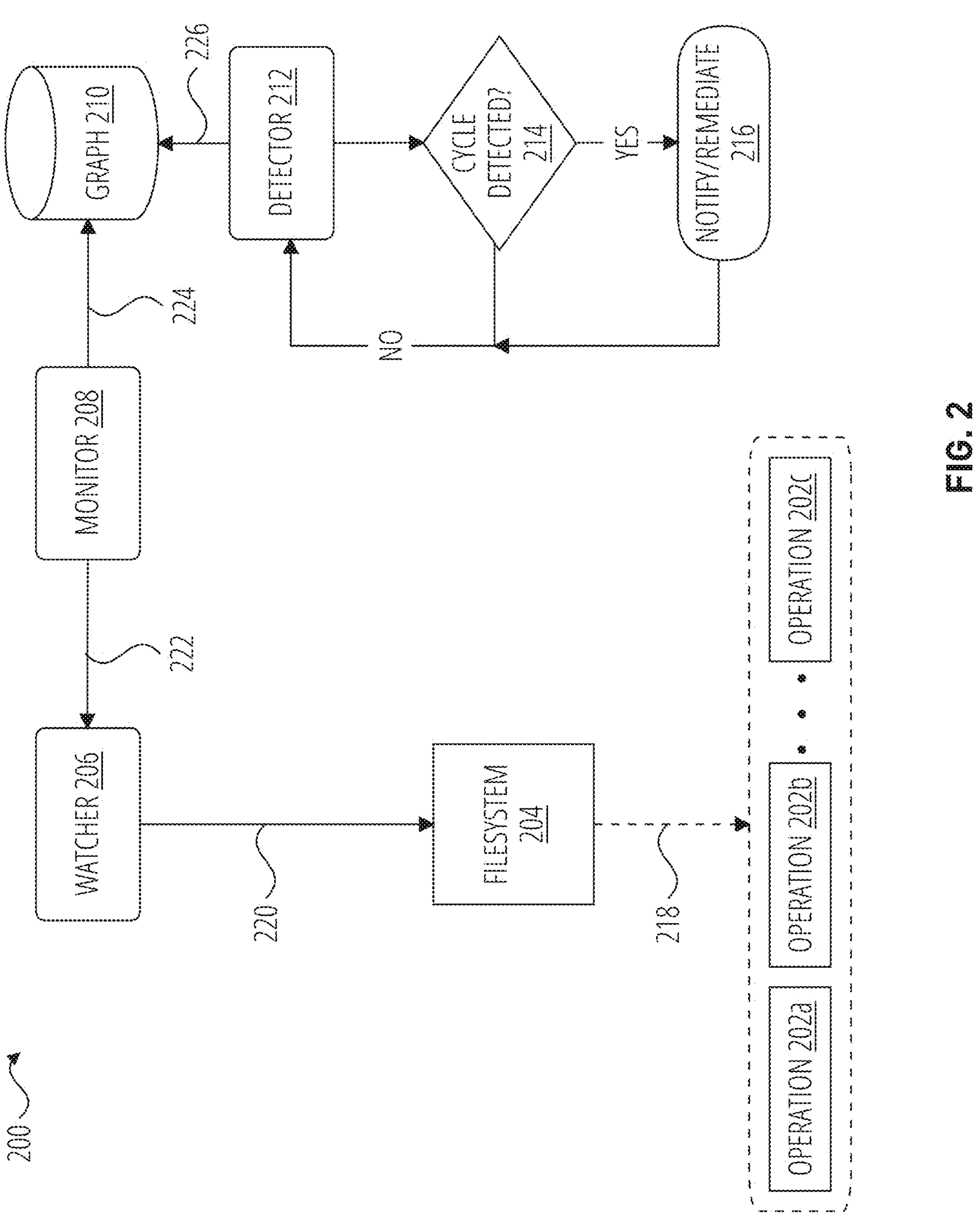
FIG. 2 illustrates a process flow for supporting graph-based circular link monitoring according to some embodiments of the present disclosure.

FIG. 2 illustrates a process flow 200 for supporting graph-based circular link monitoring according to some embodiments. For example, process flow 200 may correspond to interactions between various components for detecting circular links and generating notifications and/or remedial actions in response. For example, process flow 200 may cause an internal graph representation of links (e.g., graph 210) to be constructed and maintained continuously in real-time by leveraging filesystem events generated by watcher 206 to identify changes to filesystem 204 and causing monitor 208 trigger updates to the graph 210. Further, the graph 210 may be analyzed, such as by detector 212, to proactively identify circular links and generate notifications and/or remedial actions to avoid, or reduce, negative consequences of circular links. One or more components of FIG. 2 may be the same or similar to one or more other components disclosed hereby. For example, filesystem 204, watcher 206, monitor 208, graph 210, and/or detector 212 may be the same or similar to filesystem 126, watcher 124, monitor 112, graph 122, and/or loop detector 116, respectively. Further, aspects discussed with respect to various components in FIG. 2 may be implemented by one or more other components from one or more other embodiments without departing from the scope of this disclosure. For example, filesystem 204, watcher 206, monitor 208, graph 210, and/or detector 212 may be implemented by computing device 102 without departing from the scope of this disclosure. Embodiments are not limited in this context.

In process flow 200, various operations **202*a*, 202*b*, 202*c* (collectively referred to as operations 202) may be performed on filesystem 204. In various embodiments, the operations 202 may cause modifications to the filesystem 204, such as creating, moving, or deleting files. At operation 218, the watcher 206 may monitor the filesystem 204 to detect these operations and generate corresponding output. The monitor 208 may monitor the output of the watcher 206 to determine when modifications to the filesystem 204 involve links (e.g., symbolic links) at operation 220. When a modification to the filesystem 204 involves a link, the monitor 208 may trigger an update to the graph 210 at operation 224. For example, the monitor 208 may trigger a graph administrator to update the graph 210 to include the result of the modification to the link. It will be appreciated that in some scenarios, a current graph representation of graph 210 may refer to a version of the graph 210 immediately prior to an update associated with a modification to filesystem 204 and an updated graph representation of graph 210 may refer to a version of the graph 210 immediately after an update associated with a modification to filesystem 204**.

At operation 226, the graph 210 may be analyzed by detector 212 to determine whether a circular loop is present in the graph 210 (and therefore in the filesystem 204) at block 214. In various embodiments, this procedure may utilize a cycle detection algorithm, such as Floyd's cycle-finding algorithm. If a circular loop is detected in the graph 210, one or more notifications or remedial actions may be performed at block 216, then the process flow 200 may return to detector 212 until the next analysis of the graph 210, which may be triggered periodically and/or in response to updates to the graph 210. If a circular loop is not detected, the process flow 200 may return to detector 212 until the next analysis of the graph 210.

Thus, process flow 200 may automatically and proactively identify circular links in filesystem 204 without user intervention. Further, the circular links may be identified in real-time or near real-time. In many embodiments, continuous real-time updates to the graph 210 enable circular links to be identified without having to scan the entire filesystem 204, improving efficiency and speed. Accordingly, embodiments can detect changes that produce an endless loop in real-time. In some embodiments, one or more of these techniques may be executed as a background daemon. Upon detection of a circular link, users may be alerted immediately and/or detection results can be piped into follow-up automation that resolves the problem, thus allowing for remediation before the circular links cause problems to the system. For example, a workflow may be implemented to remediate the circular link in the filesystem. In some embodiments, process flow 200 may be implemented to monitor and detect circular symbolic links in Linux filesystems in real-time. In many embodiments, process flow 200 may be implemented in systems that are not readily accessible by developers (e.g., edge and/or automotive applications) to avoid costly hardware malfunctions and/or recalls.

Figure 3A:
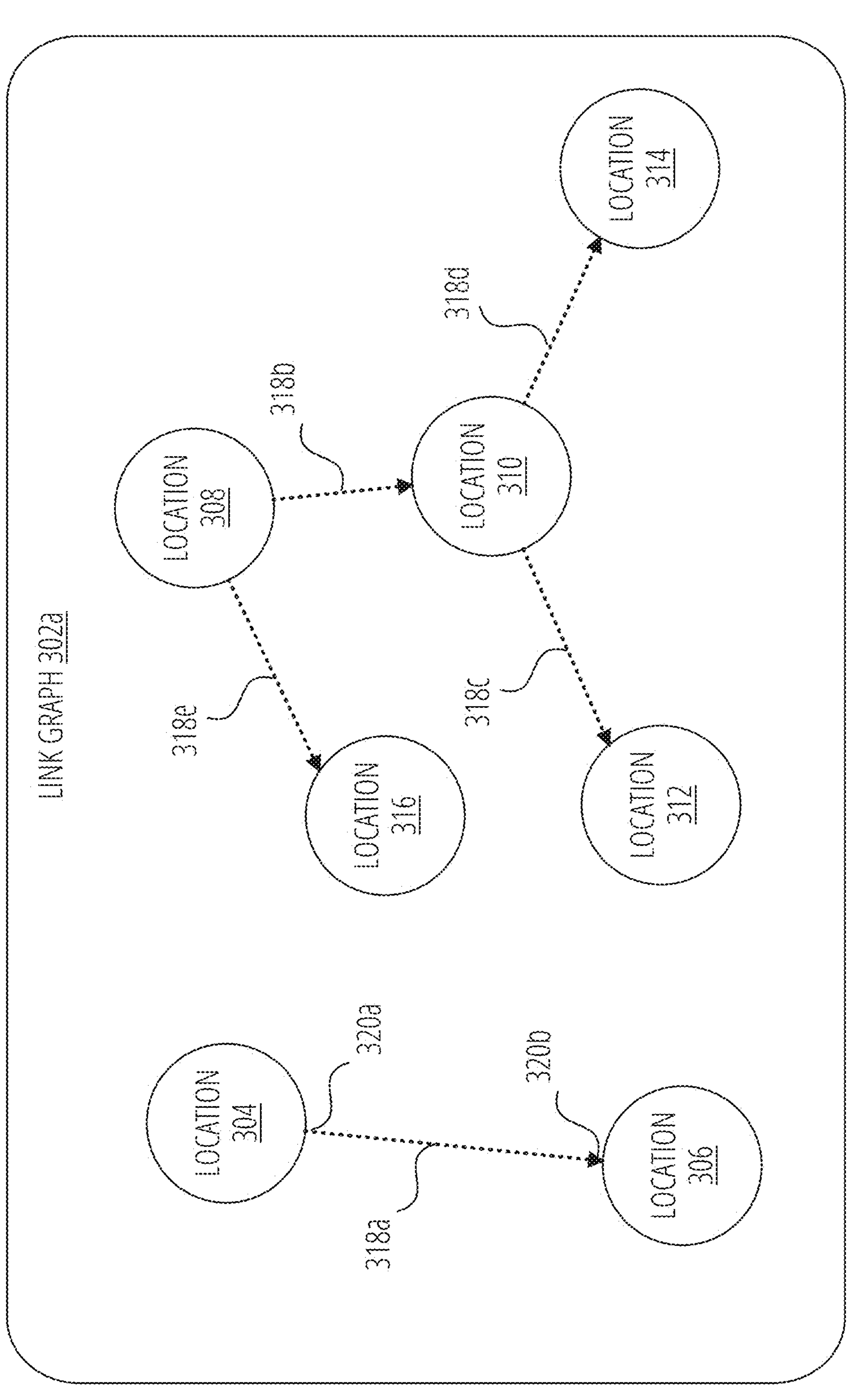
FIGS. 3A and 3B illustrate exemplary link graphs according to some embodiments of the present disclosure.
Figure 3B:
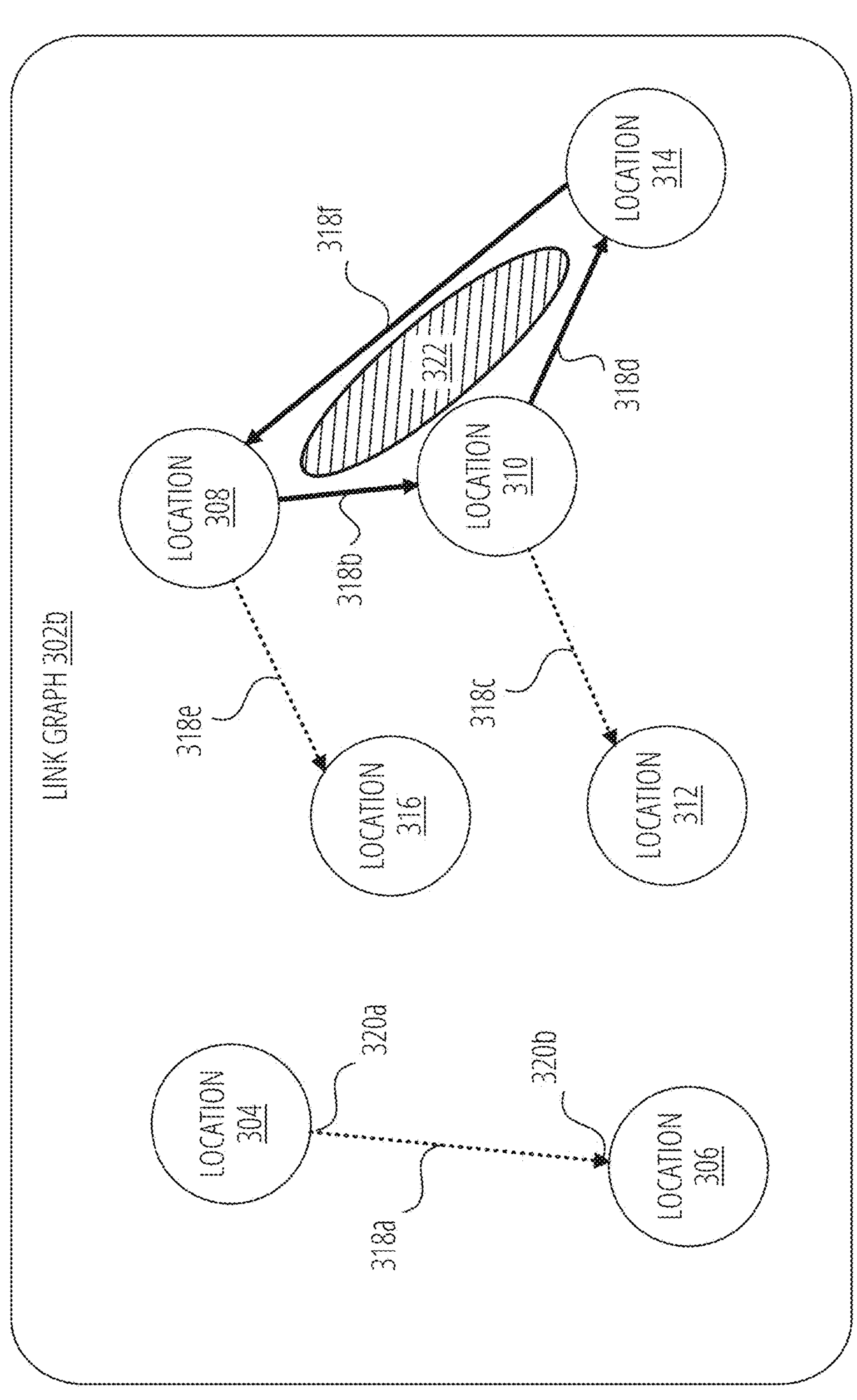

FIGS. 3A and 3B illustrate exemplary link graphs 302*a*, 302*b* (collectively referred to as link graphs 302) according to some embodiments. More specifically, the link graph 302*a* of FIG. 3A illustrates a link graph without a circular link and the link graph 302*b* illustrates a link graph with a circular link 322. As discussed in more detail below, the link graphs 302 may be utilized to track links in a filesystem. One or more components of FIGS. 3A and 3B may be the same or similar to one or more other components disclosed hereby. For example, link graph 302*a* may be the same or similar to a current version of graph 122 or graph 210 and link graph 302*b* may be the same or similar to an updated version of graph 122 or graph 210. Further, aspects discussed with respect to various components in FIGS. 3A and 3B may be implemented by one or more other components from one or more other embodiments without departing from the scope of this disclosure. For example, link graphs 302 may be created and maintained by graph administrator 114 without departing from the scope of this disclosure. Embodiments are not limited in this context.

Referring to FIG. 3A, link graph 302*a* includes nodes corresponding to locations 304, 306, 308, 310, 312, 314 (e.g., filesystem locations or memory addresses) and edges corresponding to a plurality of links 318*a*, 318*b*, 318*c*, 318*d*, 318*e* (collectively referred to as links 318). In many embodiments, the links 318 may correspond to symbolic links, which may include a type of file that points to another file or folder. Accordingly, each of the links may point from a first location (e.g., of a file), referred to as the origin, to a second location (e.g., of a file or folder), referred to as the destination. For example, link 318*a* may point from location 304 to location 306 with location 304 corresponding to the origin 320*a* of link 318*a* and location 306 corresponding to the destination 320*b* of 318*a*. Additionally, as shown in the illustrated embodiment, link 318*b* may point from location 308 to location 310, link 318*c* may point from location 310 to location 312, link 318*d* may point from location 310 to location 314, and link 318*e* may point from location 308 to location 316. Thus, the directional nature of the links in graphs may result in the graphs comprising directed graphs. It will be appreciated that the number and configuration of links in a graph may take a variety of forms based on the links present in a file system without departing from the scope of this disclosure. For example, link graph 302*a* could include another link pointing from location 304 to location 310. Further, links and locations may be added to, reconfigured, and/or removed based on modifications to the filesystem. For example, location 306 may be removed and the destination 320*b* of link 318*a* may be moved to location 314 in response to a modification to the file system.

Turning to FIG. 3B, some modifications to the filesystem may result in a circular link 322 being generated. For example, as shown in the illustrated embodiment, a filesystem modification may result in link graph 302*a* being updated to determine link graph 302*b* with link 318*f* pointing from location 314 to location 308, resulting in circular link 322. Generally, a circular link may include a set of links that form a continuous loop of one or more connected links that start at a location and end at the location. For example, the circular link 322 includes link 318*b* pointing from location 308 to location 310, link 318*d* pointing from location 310 to location 314, and link 318*f* pointing from location 314 to location 308.

Figure 4:
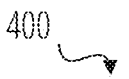
FIG. 4 illustrates a flow diagram of a method for graph-based circular link monitoring according to some embodiments of the present disclosure.
Figure 4:
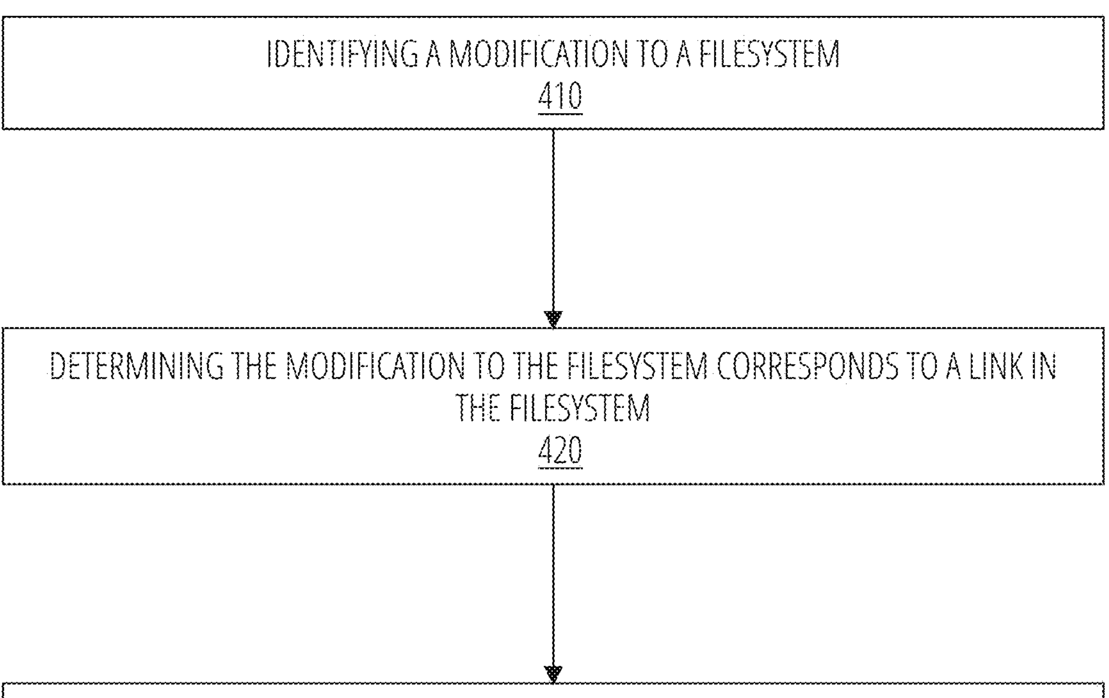

FIG. 4 is a flow diagram of a method 400 for graph-based circular link monitoring according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed through the execution of components in computing device 102, by processing device 108 of FIG. 1. Embodiments are not limited in this context.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic identifies a modification to a filesystem. For example, monitor 112 may detect a modification to filesystem 126, such as based on a notification or event generated by watcher 124. In another example, watcher 124 may detect the modification to the filesystem 126. In some embodiments, the modification to the filesystem 126 may include the creation or deletion of a file in the filesystem 126.

Proceeding to block 420, the processing logic may determine the modification to the filesystem corresponds to a link in the filesystem. For example, the monitor 112 may determine the modification to filesystem 126 corresponds to the addition of a symbolic link that includes a file that points to a different file or folder in the filesystem 126. In another example, the monitor 112 may determine the modification to filesystem 126 corresponds to the removal of a symbolic link in the filesystem 126.

At block 430, the processing logic may update a current graph representation of links in the filesystem to produce an updated graph representation of links in the filesystem that includes the link that corresponds to the modification to the filesystem based on determining the modification to the filesystem corresponds to a link in the filesystem. For example, the current graph representation of link the in filesystem may include link graph 302*a*, the updated graph representation of links in the filesystem may include link graph 302*b*, and the modification to the filesystem may correspond to the addition of link 318*f* pointing from location 314 to location 308. Further, as previously discussed, the addition of link 318*f* creates circular link 322 in link graph 302*b*, which corresponds to a circular link in the file system. Accordingly, when the link graph 302*b* is analyzed, the circular link 322 may be detected, resulting in one or more notification being generated and/or remedial actions being performed by the system.

Figure 5:
FIG. 5 illustrates a block diagram of an example system for graph-based circular link monitoring according to some embodiments of the present disclosure.
Figure 5:
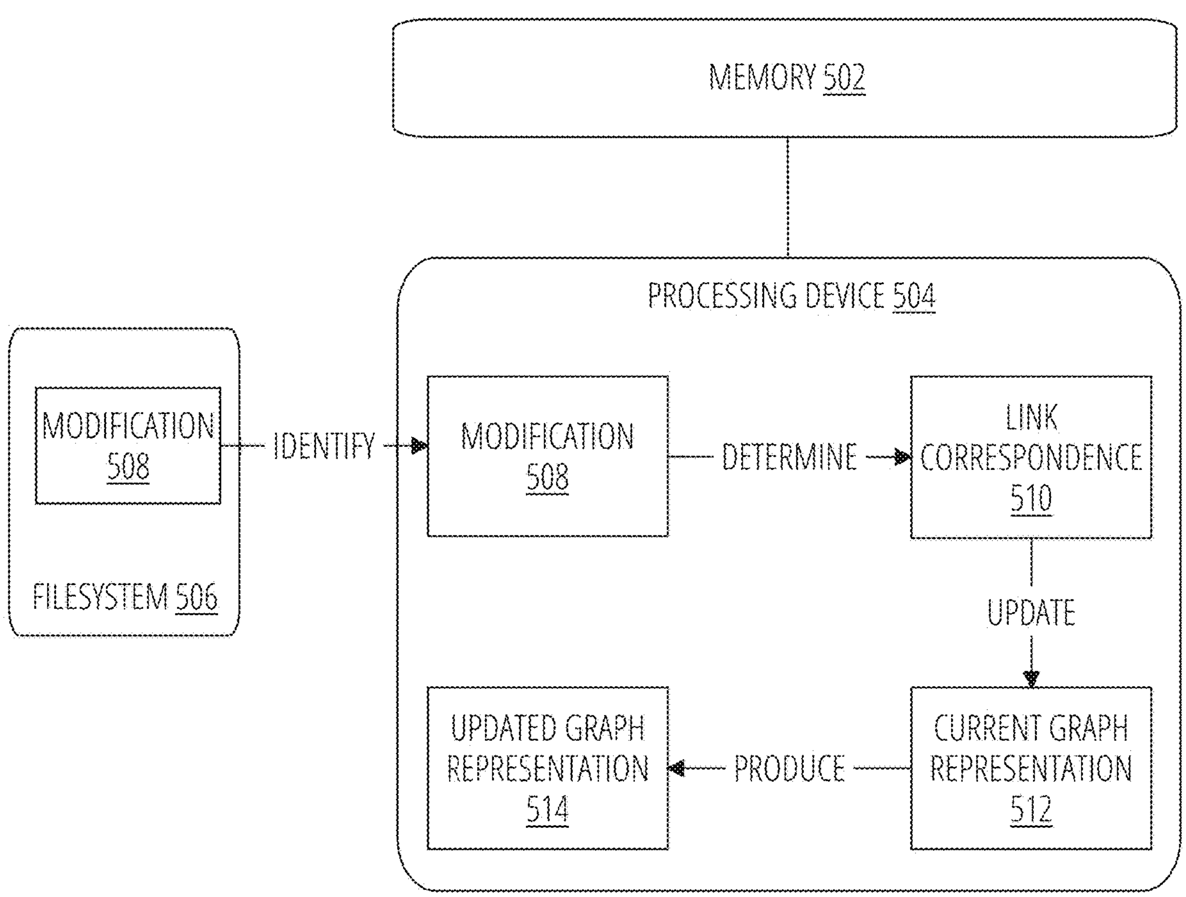

FIG. 5 illustrates a block diagram of a system 500 for supporting graph-based circular link monitoring according to some embodiments. In the illustrated embodiment, system 500 includes a memory 502, a processing device 504, filesystem 506, and a filesystem 506. It should be noted that some components of system 500 are shown for illustrative purposes only and are not physical components of the system 500, such as filesystem 506, modification 508, link correspondence 510, current graph representation 512, and/or updated graph representation 514. One or more components of FIG. 5 may be the same or similar to one or more other components disclosed hereby. For example, processing device 504 may be the same or similar to processing device 108. Further, aspects discussed with respect to various components in FIG. 5 may be implemented by one or more other components from one or more other embodiments without departing from the scope of this disclosure. For example, at least one a portion of current graph representation 512 and/or updated graph representation 514 may be included in memory 502 without departing from the scope of this disclosure. Embodiments are not limited in this context.

In system 500, the processing device 504 may identify a modification 508 to filesystem 506. In some embodiments, identification of the modification 508 may be based on a notification generated by a component (e.g., inotify component) in kernel space. In response, the processing device 504 may determine link correspondence 510 of the modification 508. In other words, the processing device 504 may determine that the modification corresponds to a link in the filesystem, such as a symbolic link. Based on this, the current graph representation 512 may be updated to produce the updated graph representation 514 including the link corresponding to the modification to the file system.

Figure 6:
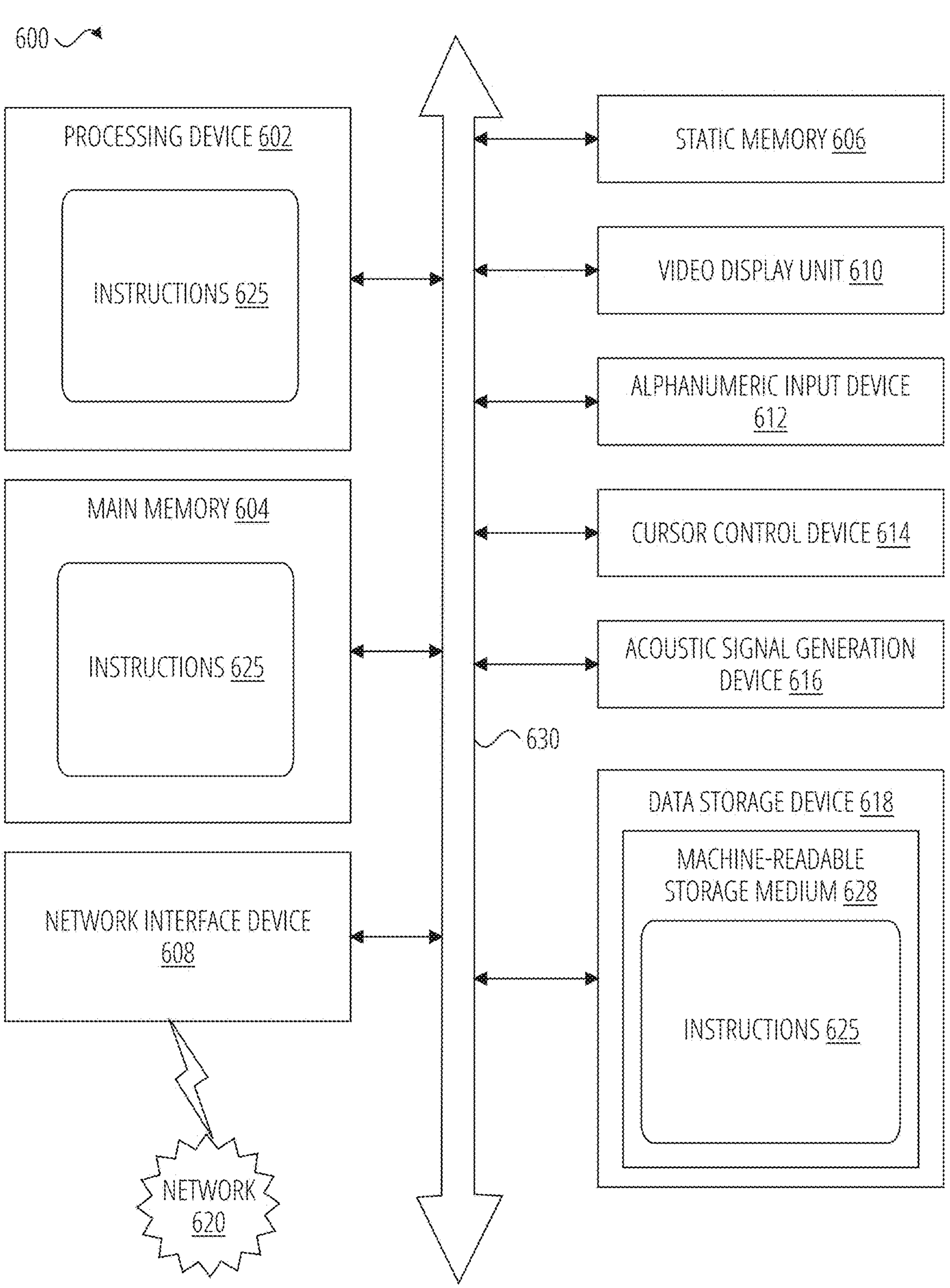
FIG. 6 illustrates a block diagram of an example system according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602 (e.g., a general purpose processor, a PLD, etc.), a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a machine-readable storage medium 628 on which may be stored one or more sets of instructions 625 that may include instructions for a component (e.g., one or more components of user space 104, kernel space 106, monitor 112, graph administrator 114, loop detector 116, notifier 118, remediator 120, monitor 208, and/or detector 212) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While machine-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "identifying," "determining," "updating," "analyzing," "detecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

monitoring a filesystem of a computing device to identify a modification to the filesystem;

determining the modification to the filesystem involves a link in the filesystem;

updating, by a processing device and in response to the determining the modification to the filesystem involves the link in the filesystem, a current graph representation of links in the filesystem to produce an updated graph representation of current links in the filesystem including the link involved with the modification to the filesystem;

analyzing the updated graph representation of links in the filesystem to detect a circular link in the filesystem;

blocking access to the circular link in the filesystem in response to detection of the circular link in the filesystem; and deleting the link involved with the modification to the filesystem in the updated graph representation in response to detection of the circular link in the filesystem.

2. The method of claim 1, wherein the detecting of the circular link in the filesystem includes:

identifying, in the updated graph representation, a first link with a first origin and a first destination and a second link with a second origin and a second destination; and determining the first destination matches the second origin and the second destination matches the first origin.

3. The method of claim 1, further comprising:

generating a user notification in response to detecting the circular link in the filesystem.

4. The method of claim 1, wherein the updated graph representation of links in the filesystem is analyzed in response to updating the current graph representation to produce the updated graph representation.

5. The method of claim 1, wherein the updated graph representation of links in the filesystem is analyzed in response to expiration of a predefined period of time.

6. The method of claim 1, wherein the link comprises a symbolic link including a file that points to a different file or folder in the filesystem or another filesystem.

7. The method of claim 1, further comprising monitoring notifications generated by a component of a kernel space comprising the filesystem to identify the modification to the filesystem.

8. The method of claim 1, wherein updating the current graph representation to produce the updated graph representation comprises:

generating a new node in the current graph representation of links in response to the modification to the filesystem, wherein the new node corresponds to an origin of the link; and connecting the new node in the current graph representation to an existing node in the current graph representation based on the modification to the filesystem.

9. The method of claim 1, wherein the link in the updated graph representation includes a connection between a first node and a second node, the first node corresponds to an origin of the link, and the second node corresponds to a destination of the link.

10. A system comprising:

a memory; and a processing device, operatively coupled to the memory, to:

monitor a filesystem of a computing device to identify a modification to the filesystem;

determine the modification to the filesystem involves a link in the filesystem;

update, in response to the determination the modification to the filesystem involves the link in the filesystem, a current graph representation of links in the filesystem to produce an updated graph representation of current links in the filesystem including the link involved with the modification to the filesystem;

analyze the updated graph representation of links in the filesystem to detect a circular link in the filesystem;

block access to the circular link in the filesystem in response to detection of the circular link in the filesystem; and delete the link involved with the modification to the filesystem in the updated graph representation in response to detection of the circular link in the filesystem.

11. The system of claim 10, wherein the detection of the circular link in the filesystem causes the processing device to:

identify, in the updated graph representation, a first link with a first origin and a first destination and a second link with a second origin and a second destination; and determine the first destination matches the second origin and the second destination matches the first origin.

12. The system of claim 10, wherein the processing device is further to:

generate a user notification in response to detecting the circular link in the filesystem.

13. The system of claim 10, wherein the updated graph representation of links in the filesystem is analyzed in response to updating the current graph representation to produce the updated graph representation.

14. The system of claim 10, wherein the updated graph representation of links in the filesystem is analyzed in response to expiration of a predefined period of time.

15. A non-transitory computer-readable storage medium including instructions that, when executed by a processing device, cause the processing device to:

monitor a filesystem of a computing device to identify a modification to the filesystem;

determine the modification to the filesystem involves a link in the filesystem;

update, by a processing device and in response to the determining the modification to the filesystem involves the link in the filesystem, a current graph representation of links in the filesystem to produce an updated graph representation of current links in the filesystem including the link involved with the modification to the filesystem;

analyze the updated graph representation of links in the filesystem to detect a circular link in the filesystem;

block access to the circular link in the filesystem in response to detection of the circular link in the filesystem; and delete the link involved with the modification to the filesystem in the updated graph representation in response to detection of the circular link in the filesystem.

16. The non-transitory computer-readable storage medium of claim 15, wherein the instructions, when executed by the processing device, further cause the processing device to monitor notifications generated by a component of a kernel space comprising the filesystem to identify the modification to the filesystem.

17. The non-transitory computer-readable storage medium of claim 15, wherein to update the current graph representation to produce the updated graph representation the instructions, when executed by the processing device, further cause the processing device to:

generate a new node in the current graph representation of links in response to the modification to the filesystem, wherein the new node corresponds to an origin of the link; and connect the new node in the current graph representation to an existing node in the current graph representation based on the modification to the filesystem.

18. The non-transitory computer-readable storage medium of claim 15, wherein the link in the updated graph representation includes a connection between a first node and a second node, the first node corresponds to an origin of the link, and the second node corresponds to a destination of the link.

19. The method of claim 1, further comprising at least one of:

placing an operating system into a safe mode or a limited mode in response to detecting the circular link in the filesystem;

blocking access to one or more portions of the filesystem in response to detecting the circular link in the filesystem; or deleting one or more portions of the circular link in response to detecting the circular link in the filesystem.

20. The system of claim 10, wherein the processing device is further to:

place an operating system into a safe mode or a limited mode in response to detecting the circular link in the filesystem;

block access to one or more portions of the filesystem in response to detecting the circular link in the filesystem; or delete one or more portions of the circular link in response to detecting the circular link in the filesystem.

* * * * *